United States Patent
Pan

(10) Patent No.: US 10,085,297 B2
(45) Date of Patent: Sep. 25, 2018

(54) METHOD AND APPARATUS SUPPORTING DEVICE-TO-DEVICE (D2D) COMMUNICATION IN A WIRELESS COMMUNICATION SYSTEM

(71) Applicant: INNOVATIVE SONIC CORPORATION, Taipei (TW)

(72) Inventor: Li-Te Pan, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 0 days.

(21) Appl. No.: 14/558,028

(22) Filed: Dec. 2, 2014

(65) Prior Publication Data
US 2015/0156806 A1 Jun. 4, 2015

Related U.S. Application Data

(60) Provisional application No. 61/910,575, filed on Dec. 2, 2013.

(51) Int. Cl.
*H04W 72/02* (2009.01)
*H04W 76/14* (2018.01)
*H04W 72/12* (2009.01)

(52) U.S. Cl.
CPC ......... *H04W 76/14* (2018.02); *H04W 72/121* (2013.01)

(58) Field of Classification Search
CPC ............................ H04W 72/0406; H04W 72/04
See application file for complete search history.

(56) References Cited

U.S. PATENT DOCUMENTS

| | | | | |
|---|---|---|---|---|
| 2010/0011110 A1* | 1/2010 | Doppler | ............... | H04W 76/023 709/228 |
| 2011/0321050 A1* | 12/2011 | Ho | .......... | H04W 4/08 718/102 |
| 2012/0093098 A1* | 4/2012 | Charbit | ................. | H04W 72/04 370/329 |
| 2012/0163235 A1* | 6/2012 | Ho | ....... | H04W 76/023 370/254 |
| 2012/0300662 A1* | 11/2012 | Wang | .................... | H04W 72/02 370/252 |
| 2013/0150061 A1* | 6/2013 | Shin | ....... | H04W 4/005 455/450 |
| 2013/0308551 A1* | 11/2013 | Madan | .............. | H04W 72/0406 370/329 |
| 2014/0010175 A1* | 1/2014 | Chiu | ................... | H04W 72/042 370/329 |
| 2014/0010209 A1* | 1/2014 | Hakola | ................. | H04W 24/02 370/336 |

(Continued)

*Primary Examiner* — Cindy Trandai
(74) *Attorney, Agent, or Firm* — Blue Capital Law Firm, P.C.

(57) ABSTRACT

A method of a UE being served by a eNB for supporting device to device (D2D) communication is disclosed. The method includes the UE receiving a message that includes information pertaining to a first resource pool provided by the eNB, wherein resources of the first resource pool are common resources shared by more than one UE using the first resource pool. The method further includes the UE being configured with a second resource pool provided by the eNB, wherein the second resource pool is different from the first resource pool. Furthermore, the method includes the UE selecting resource(s) from the second resource pool and uses the selected resource(s) for D2D transmission.

20 Claims, 6 Drawing Sheets

(56) References Cited

U.S. PATENT DOCUMENTS

| | | | | |
|---|---|---|---|---|
| 2014/0307611 A1* | 10/2014 | Tesanovic | ............ | H04W 8/005 370/312 |
| 2015/0045018 A1* | 2/2015 | Liu | ........................... | H04L 1/00 455/426.1 |
| 2015/0049732 A1* | 2/2015 | Xue | ...................... | H04L 1/1854 370/330 |
| 2015/0094057 A1* | 4/2015 | Lu | ......................... | H04W 8/005 455/434 |
| 2015/0250011 A1* | 9/2015 | Lindoff | ............... | H04W 76/023 370/225 |
| 2016/0057693 A1* | 2/2016 | Nagata | .................. | H04W 8/005 370/254 |

* cited by examiner

METHOD AND APPARATUS SUPPORTING DEVICE-TO-DEVICE (D2D) COMMUNICATION IN A WIRELESS COMMUNICATION SYSTEM

CROSS-REFERENCE TO RELATED APPLICATIONS

The present Application claims the benefit of U.S. Provisional Patent Application Ser. No. 61/910,575 filed on Dec. 2, 2013, the entire disclosure of which is incorporated herein by reference.

FIELD

This disclosure generally relates to wireless communication networks, and more particularly, to a method and apparatus for supporting D2D (Device-To-Device) communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method of a UE served by a eNB for supporting device to device (D2D) communication is disclosed. The method includes the UE receiving a message that includes information pertaining to a first resource pool provided by the eNB, wherein resources of the first resource pool are common resources shared by more than one UE using the first resource pool. The method further includes the UE being configured with a second resource pool provided by the eNB, wherein the second resource pool is different from the first resource pool. Furthermore, the method includes the UE selecting resource(s) from the second resource pool and uses the selected resource(s) for D2D transmission.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including Document Nos. SP-110638, "WID on Proposal for a study on Proximity-based Services"; 3GPP RAN2#84 minutes; 3GPP R2-133840, "CSMA/CA based resource selection", Samsung; 3GPP R2-134061, "CSMA or Coordinated Access based Resource Allocation for D2D Communication", CATT; 3GPP TS36.321 v11.2.0, "Medium Access Control (MAC) protocol specification"; 3GPP TS 22.803 v12.2.0, "Feasibility Study for Proximity Services (ProSe)"; and R2-134213 "Medium access control mechanism for D2D communication", ZTE corporation. The standards and documents listed above are hereby expressly incorporated by reference in their entirety.

Figure 1:
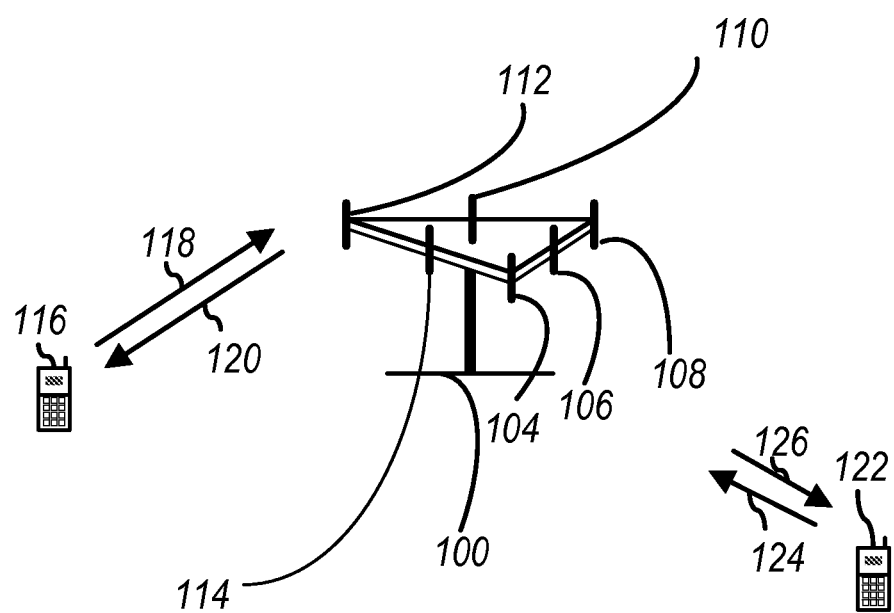
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122.

Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
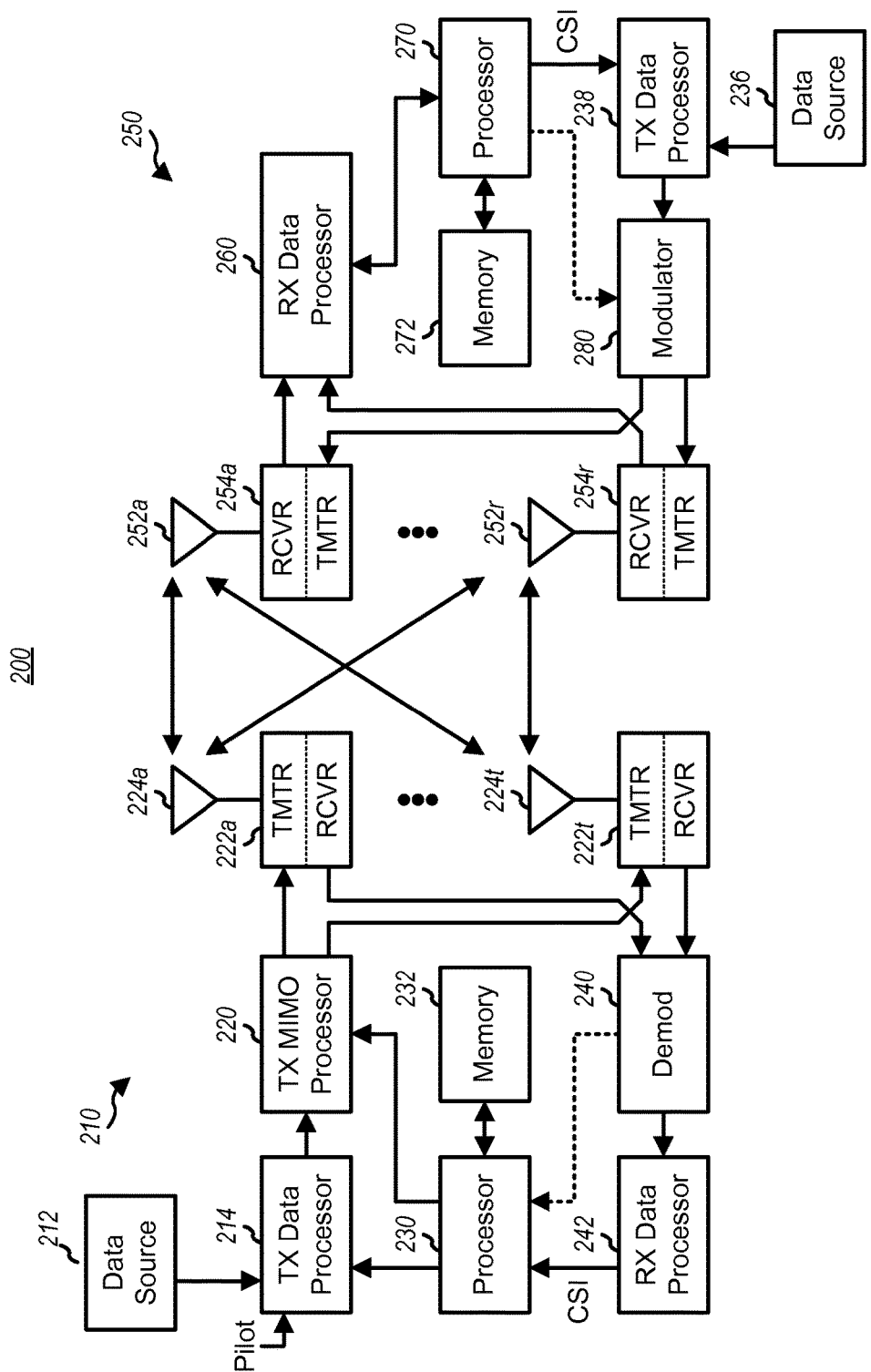
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reverse link message transmitted by the receiver system 250. Processor 230 then determines which pre-coding matrix to use for determining the beamforming weights then processes the extracted message.

Figure 3:
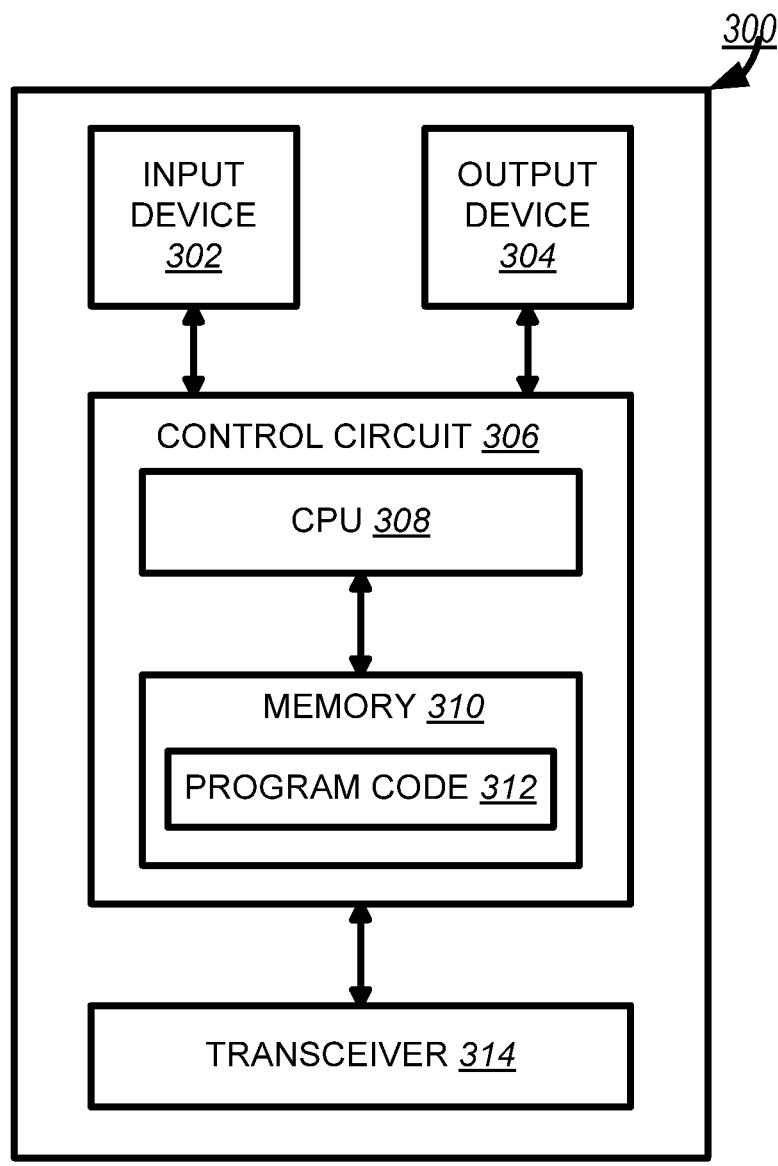
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
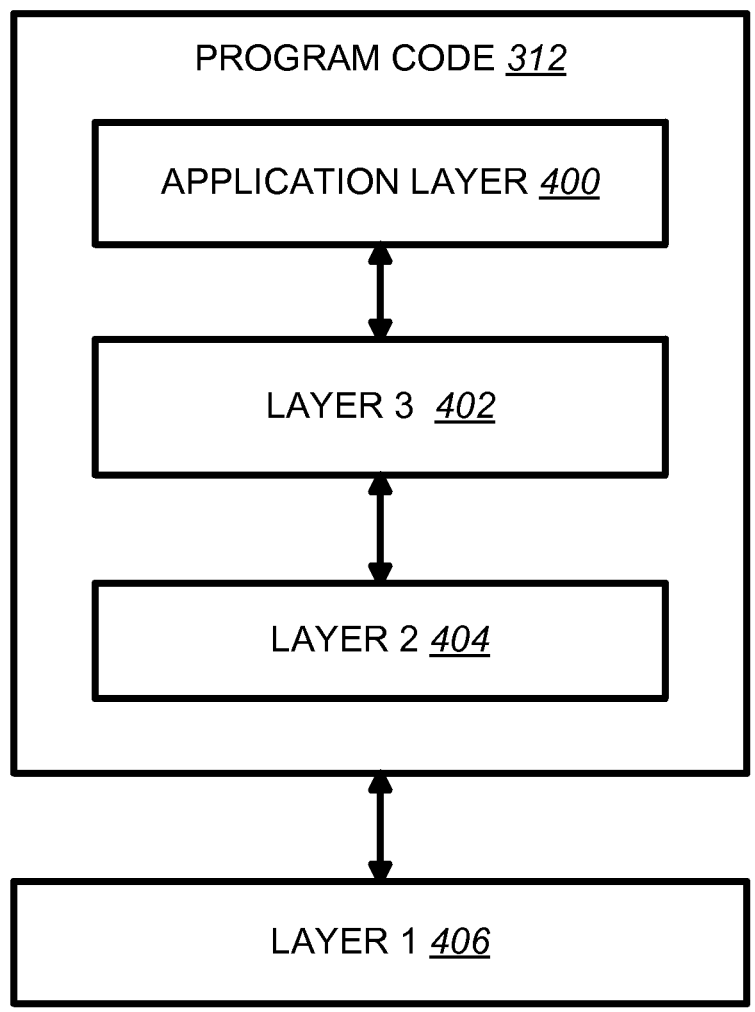
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE or LTE-A systems, the Layer 2 portion may include a Radio Link Control (RLC) layer and a Medium Access Control (MAC) layer. The Layer 3 portion may include a Radio Resource Control (RRC) layer.

3GPP SP-110638 proposes a new study item on proximity-based services (ProSe), called D2D (device-to-device). As discussed in 3GPP SP-110638, the justification and objective of this study item are as follows:
3 Justification
Proximity-based applications and services represent a recent and enormous socio-technological trend. The principle of these applications is to discover instances of the applications running in devices that are within proximity of each other, and ultimately also exchange application-related data. In parallel, there is interest in proximity-based discovery and communications in the public safety community.

Current 3GPP specification are only partially suited for such needs, since all such traffic and signalling would have to be routed in the network, thus impacting their performance and adding un-necessary load in the network. These current limitations are also an obstacle to the creation of even more advanced proximity-based applications.

In this context, 3GPP technology, has the opportunity to become the platform of choice to enable proximity-based discovery and communication between devices, and promote a vast array of future and more advanced proximity-based applications.

4 Objective

The objective is to study use cases and identify potential requirements for an operator network controlled discovery and communications between devices that are in proximity, under continuous network control, and are under a 3GPP network coverage, for:
 1. Commercial/social use
 2. Network offloading
 3. Public Safety
 4. Integration of current infrastructure services, to assure the consistency of the user experience including reachability and mobility aspects Additionally, the study item will study use cases and identify potential requirements for
 5. Public Safety, in case of absence of EUTRAN coverage (subject to regional regulation and operator policy, and limited to specific public-safety designated frequency bands and terminals)

Use cases and service requirements will be studied including network operator control, authentication, authorization, accounting and regulatory aspects.

The study does not apply to GERAN or UTRAN.

In RAN2#84, CSMA-like (Carrier Sense Multiple Access) based solution for resource allocation on D2D direct communication is supported by some companies since it is simple to implement. As discussed in 3GPP R2-133840 and R2-134061, the CSMA-like based solution could be also used for in-coverage case. However, there is a concern about QoS (Quality of Service) assurance for this kind of solution. More specifically, in the case of in-coverage, the eNB (evolved Node B) may still need to involve in resource allocation to meet the QoS requirement and reduce the potential interference, as discussed in 3GPP R2-134213. Besides, as described in 3GPP RAN2#84, a consensus of resource pool for D2D communication reception was discussed and agreed upon as follows:

CB: [D2D] Should discuss offline a possible way forward on resource allocation for communication (QC)
  QC indicates that they tried to start the discussion from out of coverage but that did not really succeed.
  QC indicates that there was a discussion on the resource pool. There seems to be consensus that for in-coverage a resource pool is allocated by eNB via SIB. This resource would inform D2D receivers where to receive D2D. This does not imply that resources of the resource pool are allocated to UEs in a distributed fashion. QC thinks it is FFS how resources are allocated/managed to in-coverage and out-of-coverage UEs.
  Samsung wonders whether the reception pool shouldn't be the same in the entire PLMN. ZTE thinks that the pool inside coverage could be different from the pool used outside coverage. Ericsson thinks we should start with the assumption that there are four resource pools (in/out and tx/rx). We could later discuss how to restrict/configure them. TI agrees that we should start assuming that flexibility. IDT wonders how this works when we want to ensure reception in partial coverage.
  Huawei thinks that a kind of resource assignment could be sent inside the pool but cover also resources outside the pool.

Agreements

1 UEs in-coverage and out-of-coverage need to be aware of a resource pool (time/frequency) for D2D communication reception.

FFS how UEs are configured with the reception pool.

FFS how transmission resources are handled/allocated.

Although CSMA-like based solution for the resource allocation for D2D communication reception would degrade the system performance (due to potential transmission collision), such solution is still welcome and supported because it is simple to implement. In RAN2#84, it has been agreed that the UE (User Equipment) needs to be aware of resource pool for D2D communication. Besides, a consensus seems to have been reached that the eNB would not assign the resources of resource pool to UEs. Thus, a possible scenario could occur where a UE, which would like to perform D2D communication, could only use the CSMA-like based mechanism to contend for resources in the resource pool with other UEs. Since an eNB may switch some data session from an infrastructure path to a D2D path for some purposes (such as system offloading), a method of using the mechanism of CSMA-like based solution to meet QoS assurance for those purposes seems to be needed.

In general, the concept of this invention in accordance with one embodiment is that the eNB sends a specific message including a specific resource pool to the specific UEs, wherein the resources of specific resource pool is different from the resources of resource pool as predefined in the SIB (System Information Block) for example. Furthermore, the specific UEs perform the same or similar procedure of the mechanism of CSMA-like based solution, for example, to select the resource from the specific resource pool and use it for D2D communication.

Figure 5:
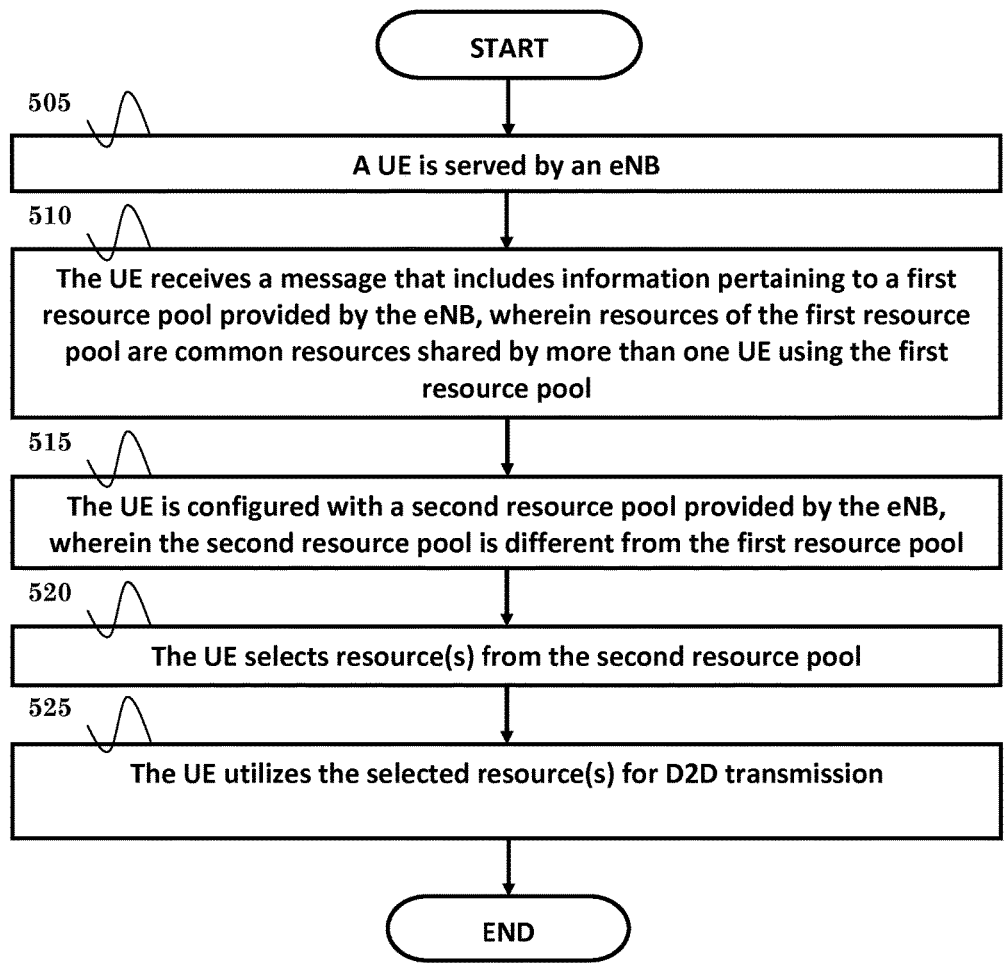
FIG. 5 is a flow chart according to one exemplary embodiment.

FIG. 5 is a flow chart 500 according to one exemplary embodiment. In step 505, a UE is served by an eNB. In one embodiment, the UE may be served by at least a cell controlled by the eNB. In step 510, the UE receives a message that includes information pertaining to a first resource pool provided by the eNB, wherein resources of the first resource pool are common resources shared by more than one UE using the first resource pool. In one embodiment, the UE may receive a message including the first resource pool. Furthermore, the message may be a system information broadcasted by the eNB. In one embodiment, a common resource may be a resource that could be used by a UE in RRC_IDLE for D2D communication and that could be shared and contended for among different UEs in RRC_IDLE. In one embodiment, a common resource may be a resource that could be used by a UE for D2D communication and that could be shared and contended for among different UEs. For example, the common resource of the first resource pool may be a resource that could be used for D2D transmission by more than one UE.

In step 515, the UE is configured with a second resource pool provided by the eNB, wherein the second resource pool is different from the first resource pool. In one embodiment, the UE may be configured with the second resource pool via a RRC (Radio Resource Control) message received from the eNB. Alternatively, the UE may be configured with the second resource pool via a L2 message received from the eNB. In addition, the L2 message may be a MAC (Medium Access Control) control element. Furthermore, the resource of the second resource pool may be a resource that could be used for D2D transmission and that may be specifically used by at least a specific UE and is not shared and contended by other UEs using the first resource pool.

In one embodiment, a resource of the second resource pool may be a resource that could be used by a UE in RRC_CONNECTED for D2D communication and that may be specifically used by at least a specific UE in RRC_CONNECTED and may not be shared and contended for among different UEs in RRC_IDLE. In one embodiment, a resource of the second resource pool may be a resource that could be used by a UE for D2D communication and that may be specifically used by at least a specific UE and may not be shared and contended for among different UEs.

In one embodiment, the UE may establish a direct communication with another UE. Furthermore, the UE may be asked to establish the direct communication with another UE because at least a data session needs to be switched from an infrastructure path to a D2D path for example. In addition, the UE may establish the direct communication to assure that QoS (Quality of Service) requirement is initialized for at least a service via D2D communication. In one embodiment, the direct communication may be established before the start of D2D transmission. Furthermore, during the establishment of the direct communication, the UE may inform the network that it is going to have an action related to the direct communication with another UE, and then may receive a response message from the network. In addition, the response message may be a RRC message or a L2 message. In one embodiment, during the establishment of the direct communication, the UE may exchange with the other UE the parameters associated with the direct communication. Furthermore, during the establishment of the direct communication, the UE may establish at least an associated logical channel and at least an associated transport channel.

In step 520, the UE selects the resource(s) from the second resource pool. In one embodiment, the UE may use a mechanism, which is used to select the resources from the first resource pool, to select the resources from the second resource pool. Furthermore, the mechanism may be based on random selection. In one embodiment, the mechanism may be based on CSMA-like (Carrier Sense Multiple Access) based solution. Furthermore, the direct communication could be a ProSe direct communication.

In step 525, the UE utilizes the selected resource(s) for D2D transmission. In one embodiment, the UE utilizes the selected resource(s) to transmit data to another UE. In one embodiment, the UE may establish at least an associated logical channel and at least an associated transport channel before the start of D2D transmission.

Referring back to FIGS. 3 and 4, the device 300 includes a program code 312 stored in memory 310. In one embodiment, the CPU 308 could execute program code 312 to (i) enable a UE to be served by a eNB, (ii) enable the UE to receive a message that includes information pertaining to a first resource pool provided by the eNB, wherein resources of first resource pool are common resources shared by more than one UE using the first resource pool, (iii) enable the UE to be configured with a second resource pool provided by the eNB, wherein the second resource pool is different from the first resource pool, and (iv) enable the UE to select resource(s) from the second resource pool and to use the selected resource(s) for D2D transmission. Furthermore, in one embodiment, the CPU could execute program code 312 to enable the UE to establish a direct communication to assure that QoS requirement is initialized for at least a service via D2D communication. In addition, the CPU could execute program code 312 to enable the UE to use a mechanism, which is used to select resources from the first resource pool, to select the resources from the second resource pool. In addition, the mechanism may be based on random selection. Furthermore, the mechanism may be based on CSMA-like (Carrier Sense Multiple Access) based solution.

In addition, the CPU 308 can execute the program code 312 to perform all of the above-described actions and steps or others described herein.

Figure 6:
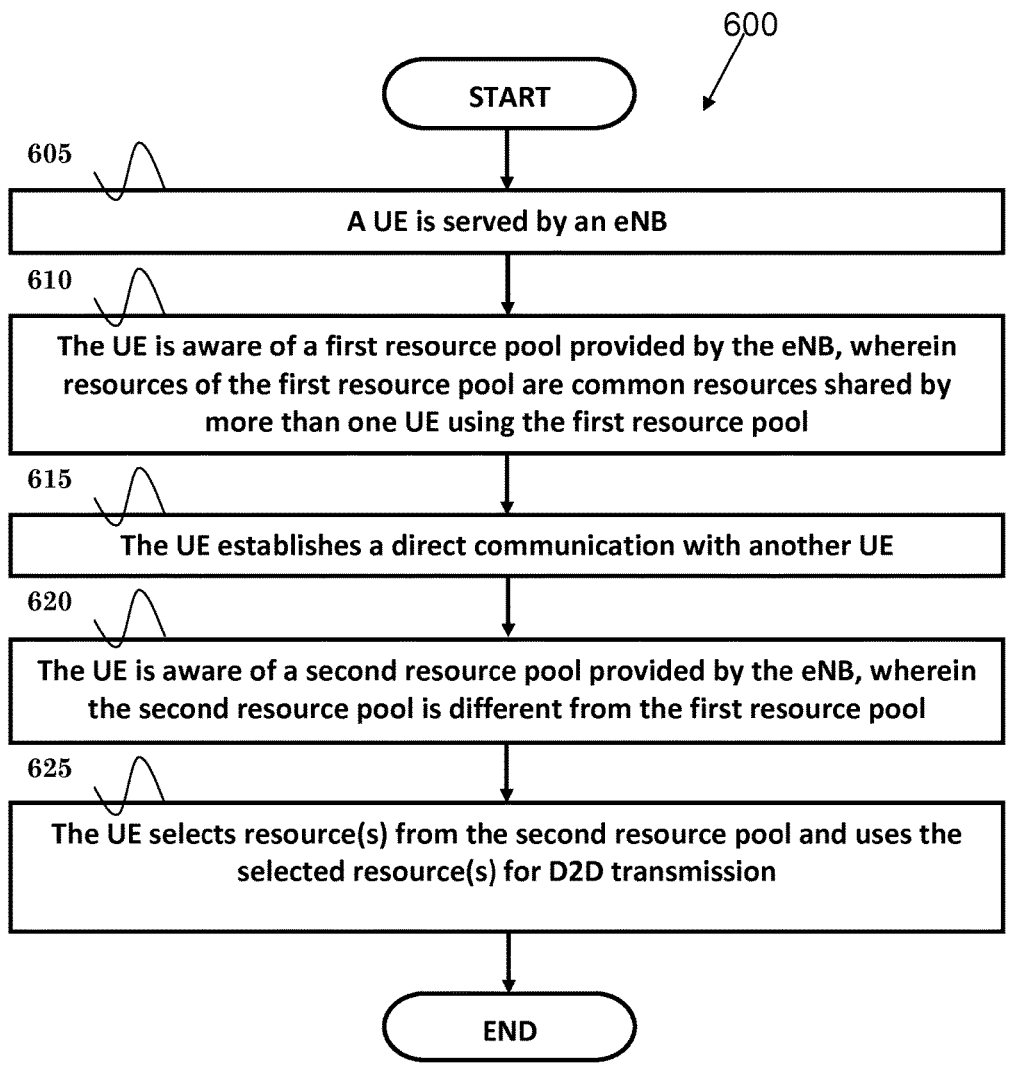
FIG. 6 is a flow chart according to one exemplary embodiment.

FIG. 6 is a flow chart 600 in accordance with one exemplary embodiment. In step 605, a UE is served by an eNB. In one embodiment, the UE is served by at least a cell controlled by the eNB. In step 610, the UE is aware of a first resource pool provided by the eNB, wherein resources of the first resource pool are common resources shared by more than one UE using the first resource pool. In one embodiment, the UE receives a message that includes information pertaining to the first resource pool. In addition, the message may be a system information broadcasted by the eNB. In one embodiment, a common resource is a resource that could be used by a UE in RRC_IDLE for D2D communication and that could be shared and contended for among different UEs in RRC_IDLE. In one embodiment, a common resource is a resource that could be used by a UE for D2D communication and that could be shared and contended for among different UEs. The D2D transmission is for the UE to directly transmit data to another UE.

In step 615, the UE establishes a direct communication with another UE. In one embodiment, the UE may be asked to establish a direct communication with another UE because a data session needs to be switched from an infrastructure path to a D2D path for example. In one embodiment, during the establishment of the direct communication, the UE may inform the network that it is going to have an action related to the direct communication with the other UE, and then receive a response message from the network. In addition, the response message may be a RRC message or a L2 message. In one embodiment, during the establishment of the direct communication, the UE may exchange with the other UE the parameters associated with the direct communication. In addition, during the establishment of the direct communication, the UE may establish at least an associated logical channel and at least an associated transport channel. Furthermore, the direct communication could be a ProSe direct communication. In one embodiment, Step 615 may occur before the start of D2D transmission.

In step 620, the UE is aware of a second resource pool provided by the eNB, wherein the second resource pool is different from the first resource pool. In one embodiment, the UE may be configured with the second resource pool via a RRC (Radio Resource Control) message received from the eNB. Alternatively, the UE may be configured with the second resource pool via a L2 message received from the eNB. In addition, the L2 message may be a MAC (Medium Access Control) control element.

Furthermore, a resource of the second resource pool may be a resource that could be used for D2D transmission and that may be specifically used by at least a specific UE and may not be shared and contended by the other UEs using the first resource pool. In addition, a resource of the second resource pool may be a resource that could be used by a UE in RRC_CONNECTED for D2D communication and that may be specifically used by at least a specific UE in RRC_CONNECTED and may not be shared and contended for among different UEs in RRC_IDLE. In one embodiment, a resource of the second resource pool may be a resource that could be used by a UE for D2D communication and that may be specifically used by at least a specific UE and may not be shared and contended for among different UEs.

In step 625, the UE selects the resource(s) from the second resource pool and uses the selected resource(s) for D2D transmission. In one embodiment, the UE may use a mechanism, which is used to select resources from the first resource pool, to select the resources from the second resource pool. Furthermore, the mechanism may be based on random selection. In addition, the mechanism may be based on CSMA-like (Carrier Sense Multiple Access) based solution. In one embodiment, the UE may establish at least an associated logical channel and at least an associated transport channel before the start of D2D transmission.

Referring back to FIGS. 3 and 4, the device 300 includes a program code 312 stored in memory 310. In one embodiment, the CPU 308 could execute program code 312 to (i) enable a UE to be served by an eNB, (ii) enable the UE to receive a message including a first resource pool provided by the eNB, wherein resources of first resource pool are common resources shared by more than one UE using the first resource pool, (iii) enable the UE to establish a direct communication with another UE, (iv) enable the UE to be configured with a second resource pool provided by the eNB, wherein the second resource pool is different from the first resource pool, and (v) enable the UE to select resource(s) from the second resource pool and to use the selected resource(s) for D2D transmission. In one embodiment, the CPU could execute program code 312 to enable the UE to use a mechanism, which is used to select resources from the first resource pool, to select the resources from the second resource pool. In addition, the mechanism may be based on random selection. In addition, the mechanism may be based on CSMA-like (Carrier Sense Multiple Access) based solution.

Furthermore, in one embodiment, the CPU could execute program code 312 to enable the UE to establish a direct communication to assure that QoS requirement is initialized for at least a service via D2D communication. In addition, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a User Equipment (UE) served by an evolved Node B (eNB) for supporting device-to-device (D2D) communication, the method comprising:
   the UE receives a message that includes information pertaining to a first resource pool provided by the eNB, wherein resources of the first resource pool are common resources shared by more than one UE using the first resource pool and are used for D2D transmission;
   the UE uses the first resource pool for D2D transmission if the UE knows the first resource pool based on the message, and the UE is not configured with a second resource pool provided by the eNB yet, wherein the second resource pool allocated by the eNB (and not allocated by any UE including the UE) is different from the first resource pool and is also used for D2D transmission;
   the UE uses the second resource pool and does not use the first resource pool for D2D transmission if the first resource pool is still available for D2D transmission and the UE is configured with the second resource pool by the eNB; and
   the UE selects resource(s) from the second resource pool and uses the selected resource(s) for D2D transmission when the UE uses the second resource pool.

2. The method of claim 1, further comprising:
   the UE is served by a cell controlled by the eNB.

3. The method of claim 1, further comprising:
   the UE establishes a direct communication with another UE.

4. The method of claim 1, further comprising:
   the UE is requested to establish a direct communication with another UE.

5. The method of claim 1, wherein the D2D transmission is for the UE to directly transmit data to another UE.

6. The method of claim 1, wherein the common resource of the first resource pool is a resource that is specifically used for D2D transmission by more than one UE.

7. The method of claim 1, wherein the message received by the UE is a system information broadcasted by the eNB.

8. The method of claim 1, further comprising:
   the UE is configured with the second resource pool via a specific RRC (Radio Resource Control) message received from the eNB.

9. The method of claim 1, further comprising:
   the UE establishes a direct communication to assure that QoS (Quality of Service) requirement is initialized for at least a service via D2D communication.

10. The method of claim 1, further comprising:
   the UE uses a mechanism, which is used to select resources from the first resource pool, to select the resource from the second resource pool.

11. The method of claim 10, wherein the mechanism is based on random selection.

12. A UE (User Equipment) for supporting device-to-device (D2D) communication, the UE comprising:
   a control circuit;
   a processor installed in the control circuit; and
   a memory installed in the control circuit and operatively coupled to the processor;
   wherein the processor is configured to execute a program code stored in the memory to:
      enable the UE to be served by a eNB (evolved Node B);
      enable the UE to receive a message that includes information pertaining to a first resource pool provided by the eNB, wherein resources of the first resource pool are common resources shared by more than one UE using the first resource pool and are used for D2D transmission;
      enable the UE to use the first resource pool for D2D transmission if the UE knows the first resource pool based on the message and the UE is not configured with a second resource pool provided by the eNB yet, wherein the second resource pool allocated by the eNB (and not allocated by any UE including the UE) is different from the first resource pool and is also used for D2D transmission;
      enable the UE to use the second resource pool and to not use the first resource pool for D2D transmission if the first resource pool is still available for D2D transmission and the UE is configured with the second resource pool by the eNB; and
      enable the UE to select resource(s) from the second resource pool and to use the selected resource(s) for D2D transmission when the UE uses the second resource pool.

13. The UE of claim 12, wherein the processor is further configured to execute a program code stored in the memory to enable the UE to be served by a cell controlled by the eNB.

14. The UE of claim 12, wherein the processor is further configured to execute a program code stored in the memory to enable the UE to establish a direct communication with another UE.

15. The UE of claim 12, wherein the processor is further configured to execute a program code stored in the memory to enable the UE to be requested to establish a direct communication with another UE.

16. The UE of claim 12, wherein the D2D transmission is for the UE to directly transmit data to another UE.

17. The UE of claim 12, wherein the message received by the UE is a system information broadcasted by the eNB.

18. The UE of claim 12, wherein the processor is further configured to execute a program code stored in the memory to enable the UE to be configured with the second resource pool via a specific RRC (Radio Resource Control) message received from the eNB.

19. The UE of claim 12, wherein the processor is further configured to execute a program code stored in the memory to enable the UE to use a mechanism, which is used to select resources from the first resource pool, to select the resources from the second resource pool.

20. The UE of claim 19, wherein the mechanism is based on random selection.

* * * * *

UNITED STATES PATENT AND TRADEMARK OFFICE
CERTIFICATE OF CORRECTION

PATENT NO. : 10,085,297 B2
APPLICATION NO. : 14/558028
DATED : September 25, 2018
INVENTOR(S) : Li-Te Pan Page 1 of 1

It is certified that error appears in the above-identified patent and that said Letters Patent is hereby corrected as shown below:

On the Title Page

Item (54), and in the Specification, in Column 1, Line 1, delete "METHOD AND APPARATUS SUPPORTING DEVICE-TO-DEVICE (D2D) COMMUNICATION IN A WIRELESS COMMUNICATION SYSTEM" and insert --METHOD AND APPARATUS FOR SUPPORTING DEVICE-TO-DEVICE (D2D) COMMUNICATION IN A WIRELESS COMMUNICATION SYSTEM--

Signed and Sealed this
Twenty-fifth Day of June, 2019

Andrei Iancu
*Director of the United States Patent and Trademark Office*